United States Patent
Johnson et al.

(10) Patent No.: US 10,058,034 B2
(45) Date of Patent: *Aug. 28, 2018

(54) COMBINE HARVESTER AND ASSOCIATED METHOD FOR GATHERING GRAIN

(71) Applicant: PIONEER HI-BRED INTERNATIONAL, INC., Johnston, IA (US)

(72) Inventors: David L. Johnson, Johnston, IA (US); Matthew John Rizzo, Wichita, KS (US); James Reuben Schmidt, Manhattan, KS (US); Barry Stott, Winterset, IA (US); Zane Wesley Unrau, Newton, KS (US)

(73) Assignee: PIONEER HI-BRED INTERNATIONAL, INC. IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,669

(22) Filed: Dec. 22, 2016

(65) Prior Publication Data

US 2017/0099773 A1 Apr. 13, 2017

Related U.S. Application Data

(63) Continuation of application No. 14/656,140, filed on Mar. 12, 2015, now Pat. No. 9,615,511, which is a
(Continued)

(51) Int. Cl.
*A01D 41/127* (2006.01)
*A01D 91/04* (2006.01)
(Continued)

(52) U.S. Cl.
CPC .............. *A01D 91/04* (2013.01); *A01D 41/02* (2013.01); *A01D 41/127* (2013.01);
(Continued)

(58) Field of Classification Search
CPC ................ A01D 41/00; A01D 41/1208; A01D 41/1217; A01D 41/1277; A01D 41/1272;
(Continued)

(56) References Cited

U.S. PATENT DOCUMENTS

| 1,625,365 A | 4/1927 | Inghram |
| 2,467,791 A | 4/1949 | Welty et al. |

(Continued)

FOREIGN PATENT DOCUMENTS

| CA | 2307857 A1 | 5/1999 |
| CA | 2331409 A1 | 11/1999 |

(Continued)

OTHER PUBLICATIONS

"Axial-Flow Combines Class V-IX" Case IH Brochure, CNH America LLC (2009), 35 pages.
(Continued)

*Primary Examiner* — Robert Eric Pezzuto

(57) ABSTRACT

A combine harvester is provided that separates grain material from material other than grain using multiple processing areas, including a harvesting area, a feederhouse area, a threshing area, a cleaning area, and a grain delivery area. In a location at or prior to entering one of the processing areas, the material may be collected and held until a collection threshold is reached. Once it is determined that the collection threshold is reached, the material forming a first group of material may be transported from the location to the processing area or a subsequent processing area. The first group of material is transported from the location to the processing area or the subsequent processing area substantially simultaneously and thus simulates the gathering of a large amount of crop material even when small plots are involved. In this way, reduced cycle times may be achieved, and the efficiency benefits of large-plot harvesting may be extended to small-plot applications.

19 Claims, 11 Drawing Sheets

Related U.S. Application Data continuation of application No. 13/656,047, filed on Oct. 19, 2012, now Pat. No. 9,011,222.

(60) Provisional application No. 61/549,820, filed on Oct. 21, 2011.

(51) Int. Cl.
    *A01D 41/02*     (2006.01)
    *A01D 61/00*     (2006.01)
    *A01F 12/44*     (2006.01)
    *A01F 12/46*     (2006.01)

(52) U.S. Cl.
     CPC .......... *A01D 61/008* (2013.01); *A01F 12/444* (2013.01); *A01F 12/46* (2013.01)

(58) Field of Classification Search
     CPC .... A01D 41/1275; A01D 46/00; A01D 91/04; A01D 41/127; A01D 41/02; A01D 61/008; A01F 7/00; A01F 12/46; A01F 12/48; A01F 12/52; A01F 12/444
     USPC .......... 56/14.6, 16.6, 328.1; 198/516, 626.6; 414/505; 460/7, 12, 13, 65, 79, 97, 114, 460/119, 149, 1
     See application file for complete search history.

(56) References Cited

U.S. PATENT DOCUMENTS

| | | |
|---|---|---|
| 3,373,871 A | 3/1968 | Huether et al. |
| 3,470,681 A | 10/1969 | Seamann |
| 3,630,011 A | 12/1971 | Dunn |
| 3,769,988 A | 11/1973 | Burenga |
| 3,772,862 A | 11/1973 | Wilson |
| 3,798,884 A | 3/1974 | Middleton |
| 3,930,354 A | 1/1976 | Borderie |
| 3,940,911 A | 3/1976 | Schmitt |
| 4,250,896 A | 2/1981 | Wagstaff et al. |
| 4,344,442 A | 8/1982 | Torland et al. |
| 4,422,462 A | 12/1983 | Decoene |
| 4,441,511 A * | 4/1984 | Schroeder ............... A01F 12/52 460/13 |
| 4,464,887 A | 8/1984 | Decoene et al. |
| 4,465,082 A | 8/1984 | Strubbe |
| 4,487,002 A | 12/1984 | Kruse et al. |
| 4,510,946 A | 4/1985 | Decoene et al. |
| 4,611,605 A | 9/1986 | Hall et al. |
| 4,663,978 A | 5/1987 | Lenski et al. |
| 4,821,744 A | 4/1989 | Turner et al. |
| 4,896,795 A | 1/1990 | Ediger et al. |
| 5,042,240 A * | 8/1991 | Rocca ................... A01D 46/00 198/516 |
| 5,059,154 A | 10/1991 | Reyenga |
| 5,092,819 A | 3/1992 | Schroeder et al. |
| 5,106,339 A | 4/1992 | Braun et al. |
| 5,173,079 A | 12/1992 | Gerrish |
| 5,327,708 A | 7/1994 | Gerrish |
| 5,380,247 A * | 1/1995 | Underwood ....... A01D 41/1208 460/114 |
| 5,489,239 A | 2/1996 | Matousek et al. |
| 5,518,454 A | 5/1996 | Twilley et al. |
| 5,527,218 A | 6/1996 | Van Den Bossche et al. |
| 5,751,421 A | 5/1998 | Wright et al. |
| 5,890,961 A | 4/1999 | Behnke et al. |
| 5,957,773 A | 9/1999 | Olmsted et al. |
| 5,987,384 A | 11/1999 | Matson |
| 5,991,025 A | 11/1999 | Wright et al. |
| 6,083,103 A | 7/2000 | Posselius et al. |
| 6,119,531 A | 9/2000 | Wendt et al. |
| 6,121,782 A | 9/2000 | Adams et al. |
| 6,242,927 B1 | 6/2001 | Adams et al. |
| 6,247,296 B1 | 6/2001 | Becker et al. |
| 6,327,899 B1 | 12/2001 | Diekhans et al. |
| 6,339,917 B1 | 1/2002 | Dillon et al. |
| 6,358,142 B1 | 3/2002 | Imel et al. |
| 6,412,260 B1 | 7/2002 | Lukac et al. |
| 6,442,916 B1 | 9/2002 | Pope |
| 6,460,008 B1 | 10/2002 | Hardt |
| 6,505,124 B2 | 1/2003 | Carr et al. |
| 6,584,424 B2 | 6/2003 | Hardt |
| 6,669,557 B2 | 12/2003 | Adams et al. |
| 6,743,093 B1 | 6/2004 | Pope et al. |
| 6,839,616 B2 | 1/2005 | Beck |
| 6,848,243 B2 | 2/2005 | Carr et al. |
| 6,926,603 B2 | 8/2005 | Kormann et al. |
| 7,140,961 B2 | 11/2006 | Visagie et al. |
| 7,318,310 B2 | 1/2008 | Kincaid |
| 7,398,636 B2 | 7/2008 | Carr et al. |
| 7,681,383 B2 | 3/2010 | Argetsinger et al. |
| 7,743,591 B2 | 6/2010 | Meier et al. |
| 7,861,606 B2 | 1/2011 | Kormann |
| 8,082,809 B2 | 12/2011 | Luellen et al. |
| 8,777,706 B2 | 7/2014 | Farley et al. |
| 9,011,222 B2 | 4/2015 | Johnson et al. |
| 2001/0054903 A1 | 12/2001 | Adams et al. |
| 2002/0124541 A1 | 9/2002 | Oepping et al. |
| 2002/0133309 A1 | 9/2002 | Hardt |
| 2003/0063276 A1 | 4/2003 | Sjodin |
| 2003/0076118 A1 | 4/2003 | Adams et al. |
| 2004/0187459 A1 | 9/2004 | Carr et al. |
| 2005/0132685 A1 | 6/2005 | Carr et al. |
| 2006/0046801 A1 | 3/2006 | Argetsinger et al. |
| 2007/0033913 A1 | 2/2007 | Kincaid |
| 2007/0186530 A1 | 8/2007 | Meier et al. |
| 2009/0258684 A1 | 10/2009 | Missotten et al. |
| 2010/0071333 A1 | 3/2010 | Temple et al. |
| 2011/0029205 A1 | 2/2011 | Ricketts et al. |
| 2011/0086684 A1 | 4/2011 | Luellen et al. |
| 2013/0337876 A1 | 12/2013 | Johnson |
| 2016/0007535 A1 | 1/2016 | Johnson |

FOREIGN PATENT DOCUMENTS

| | | |
|---|---|---|
| CN | 2252490 Y | 4/1997 |
| CN | 2331154 Y | 8/1999 |
| CN | 2377820 Y | 5/2000 |
| CN | 2381111 Y | 6/2000 |
| CN | 2421815 Y | 3/2001 |
| CN | 2425491 Y | 4/2001 |
| CN | 2524479 Y | 12/2002 |
| CN | 2794140 Y | 7/2006 |
| CN | 201078910 Y | 7/2008 |
| CN | 201101001 Y | 8/2008 |
| CN | 201349406 Y | 11/2009 |
| CN | 201349407 Y | 11/2009 |
| CN | 101617591 A | 1/2010 |
| CN | 201440818 U | 4/2010 |
| CN | 201450820 U | 5/2010 |
| CN | 201450838 U | 5/2010 |
| CN | 201700161 U | 1/2011 |
| CN | 102204446 A | 10/2011 |
| CN | 102204453 A | 10/2011 |
| DE | 1941248 A1 | 2/1971 |
| DE | 202004014608 U1 | 12/2004 |
| EP | 1083996 A1 | 3/2001 |
| EP | 2279655 A1 | 2/2011 |
| JP | 7203747 A | 8/1995 |
| JP | 7203748 A | 8/1995 |
| JP | 2000004627 A | 1/2000 |
| SU | 1130223 A1 | 12/1994 |
| WO | 9922582 A1 | 5/1999 |
| WO | 9958253 A1 | 11/1999 |
| WO | 2004080157 A2 | 9/2004 |

OTHER PUBLICATIONS

International Search Report and Written Opinion of the Searching Authority for Application No. PCT/US2010/052034 dated Jan. 11, 2011.

(56) References Cited

OTHER PUBLICATIONS

International Search Report and Written Opinion of the Searching Authority for Application No. PCT/US2012/061037 dated Jan. 28, 2013.
International Search Report and Written Opinion of the Searching Authority for Application No. PCT/US2013/045172 dated Aug. 30, 2013.

\* cited by examiner

COMBINE HARVESTER AND ASSOCIATED METHOD FOR GATHERING GRAIN

CROSS REFERENCE TO RELATED APPLICATIONS

This application is a continuation of co-pending U.S. patent application Ser. No. 14/656,140 (now U.S. Pat. No. 9,615,511) filed Mar. 12, 2015, and also claims priority from U.S. Provisional Application No. 61/549,820, filed Oct. 21, 2011 and Ser. No. 13/656,047 (now U.S. Pat. No. 9,011,222), filed Oct. 19, 2012, which applications are hereby incorporated herein in their entirety by reference.

FIELD OF THE INVENTION

The present invention relates generally to combine harvesters and methods for gathering grain. More specifically, the present invention provides a combine harvester configured for gathering grain from multiple small-area research plots using one or more staging operations in the collection process, thereby increasing the efficiency of the collection process and reducing any idle periods as the combine harvester is moved between plots.

BACKGROUND

A combine harvester (also known simply as a "combine") is a well-known machine used in agricultural applications. In general, combines are designed to travel through crop fields to harvest crop materials. Although combines may have various configurations, most are designed to separate grain from material-other-than-grain ("MOG"). Harvested grain is typically stored on the combine, and MOG is ejected back onto the crop field.

In general, a typical combine is designed to move through large crop fields, and the operations performed by the combine (e.g., cutting, threshing, and cleaning the grain) are most efficient when large amounts of grain are being processed. The combine is operated, for the most part, continuously, and the speed of the movement of the grain through the combine is generally fixed. In some cases, for example, the ground speed of the combine may be adjusted to control the volume of material through the combine. A commercial combine is typically designed to be continuously operated in a fully-loaded condition to optimize performance. Combine performance may include material throughput, harvesting efficiency, and harvested grain quality.

Combines, however, are not only used to harvest crops in a commercial setting, but are also used in research settings involving smaller plots of crops. In a research setting, the same type of combine (e.g., a commercial combine) may be used under intermittently-loaded conditions.

As a result, there is a need in the art for a combine harvester and method configured for gathering crop material efficiently from small research plots rather than continuously from large commercial fields. In addition, there is a need for a combine harvester and method that allows crop material to be gathered from multiple plots while keeping the grain gathered from each plot substantially separate and while minimizing the wait time between plots.

BRIEF SUMMARY OF VARIOUS EMBODIMENTS

The present invention addresses the above needs and achieves other advantages by providing a combine harvester and method for harvesting grain using multiple processing areas. In general, the combine harvester is moved through harvest material comprising grain material and material other than grain ("MOG"). The grain material is separated from the MOG by transporting the harvest material through the combine harvester using the multiple processing areas. In a location at or prior to entering one of the processing areas, the material is collected and held until a collection threshold is reached. After the collection threshold is reached, the material (which now forms a first group of material) is transported from the location to the processing area or a subsequent processing area. Transportation of the first group of material from the location to the processing area or the subsequent processing area substantially simultaneously thus simulates the gathering of a large amount of crop material even when small plots are involved, thereby providing the benefits of large-plot harvesting to small-plot applications, as described in greater detail below.

Accordingly, in one embodiment, a method for harvesting grain is provided that uses a combine harvester having a plurality of processing areas. The combine harvester is initially moved through harvest material comprising grain material and material other than grain. The grain material is separated from the material other than grain by transporting the harvest material through the combine harvester using the plurality of processing areas. In a location at or prior to entering one of the processing areas, material is collected in the location, a determination is made regarding whether a collection threshold is reached, and a first group of material is transported from the location to the processing area or a subsequent processing area after the collection threshold is reached. The first group of material may then be transported from the location to the processing area or the subsequent processing area substantially simultaneously. In some cases, at least one of the plurality of processing areas may be controlled independently of the other processing areas.

The plurality of processing areas may include at least a harvesting area, a feederhouse area, and a threshing area, and harvest material may be collected at the feederhouse area. Thus, the first group of material may comprise a first group of harvest material, and transporting the first group of material from the location to the processing area or a subsequent processing area after the collection threshold is reached may comprise transporting the first group of harvest material to the threshing area. In this regard, the feederhouse area may comprise a conveyance device, and collecting the harvest material at the feederhouse area may comprise moving the harvest material away from the harvesting area using the conveyance device.

In some cases, a speed of the combine harvester is greater than or equal to a speed at which the conveyance device moves the harvest material away from the harvesting area when collecting the harvest material. The conveyance device may, for example, be configured to move the harvest material away from the harvesting area when collecting the harvest material at a first speed, and the feederhouse area may be configured to transport the first group of harvest material to the threshing area at a second speed. The first speed may be less than the second speed. In addition, the conveyance device may comprise a lower member and an upper member, and at least one of the lower member and the upper member may comprise a conveyor. Both the lower member and the upper member may be configured to contact the harvest material in some cases.

In some embodiments, additional harvest material is removed using the harvesting area. The additional harvest material may be transported to the feederhouse area after transporting the first group of harvest material using the feederhouse area to the threshing area, and the additional harvest material may be collected at the feederhouse area to form an additional group of harvest material.

The determination of whether a collection threshold is reached may be made in a variety of ways. For example, the determination may include determining whether the combine has reached an end of a plot and/or whether a time period beginning at the start of collecting the harvest material is greater than or equal to a threshold time period. Determining whether a collection threshold is reached may comprise determining whether a mass of the first group of material is greater than or equal to a threshold mass. In other cases, determining whether a collection threshold is reached may comprise determining whether a volume of the first group of material is greater than or equal to a threshold volume.

In some embodiments, the plurality of processing areas may include at least one of a threshing area, a grain conveying area, a cleaning area, a grain material delivery area, and a grain testing area, and collecting material in the location, may comprise collecting grain material in a location at or prior to entering one or more of the threshing area, the grain conveying area, the cleaning area, the grain material delivery area, and the grain testing area. Collecting material in the location may comprise collecting material prior to entering the threshing area, and transporting a first group of material from the location to the processing area or a subsequent processing area after the collection threshold is reached may comprise transporting a first group of material from the location to the threshing area after the collection threshold is reached.

In still other cases, collecting material in the location may comprise collecting grain material at the grain conveying area, and transporting a first group of material from the location to the processing area or a subsequent processing area after the collection threshold is reached may comprise transporting a first group of grain material from the grain conveying area to the cleaning area after the collection threshold is reached. Furthermore, material may be collected at the cleaning area, and a first group of grain material may be transported from the cleaning area to the grain material delivery area after the collection threshold is reached.

In some embodiments, grain material may be collected prior to entering the grain material delivery area, and a first group of grain material may be transported from the location to the grain material delivery area after the collection threshold is reached. Similarly, grain material may be collected at the grain material delivery area, and a first group of grain material may be transported from the grain material delivery area to the grain testing area after the collection threshold is reached. Furthermore, grain material may be collected prior to entering the grain testing area, and transporting a first group of material from the location to the processing area or a subsequent processing area after the collection threshold is reached may comprise transporting a first group of grain material from the location to the grain testing area after the collection threshold is reached.

BRIEF DESCRIPTION OF THE DRAWINGS

Figure 1:
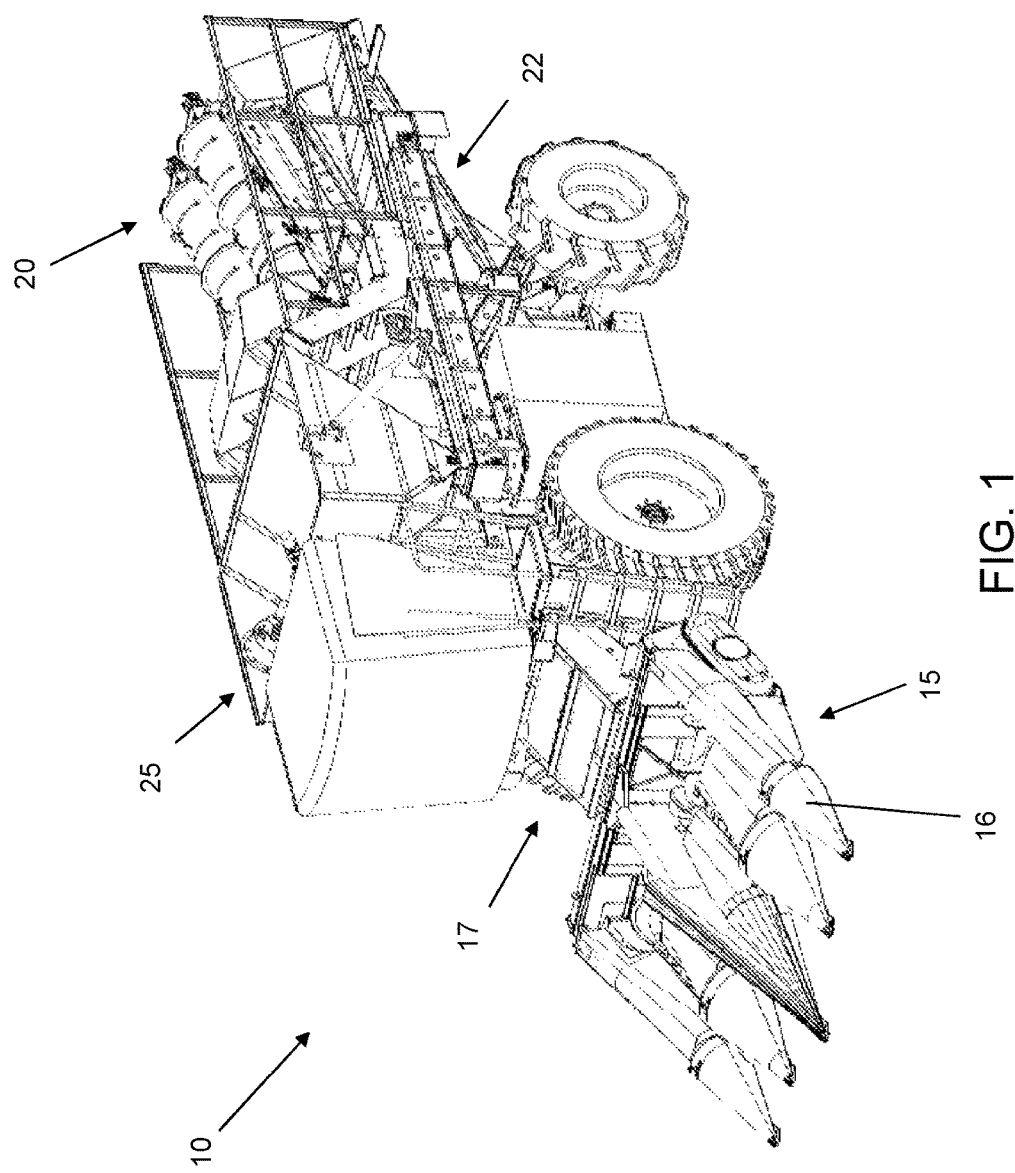
Figure 2:
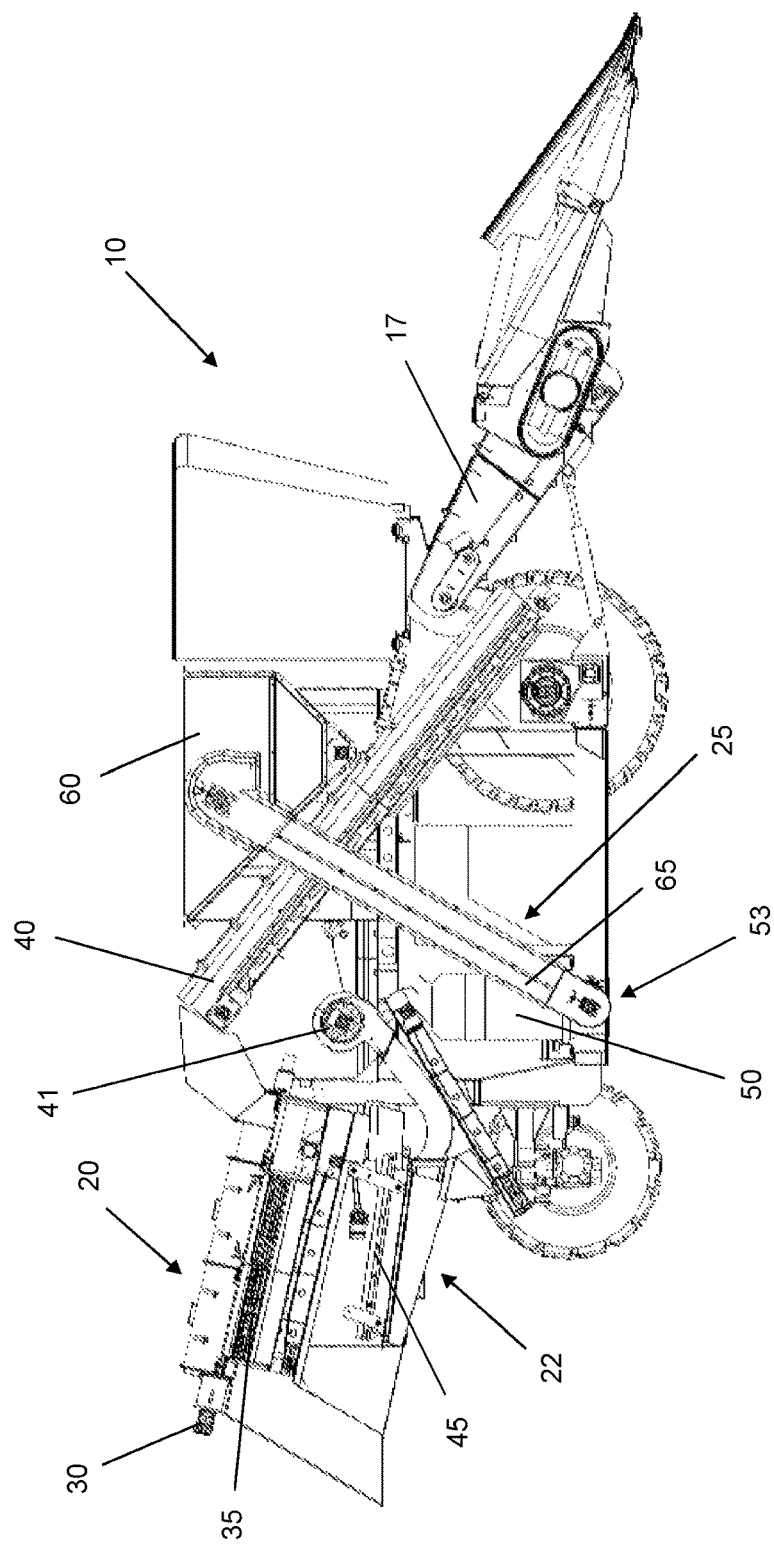
Figure 3:
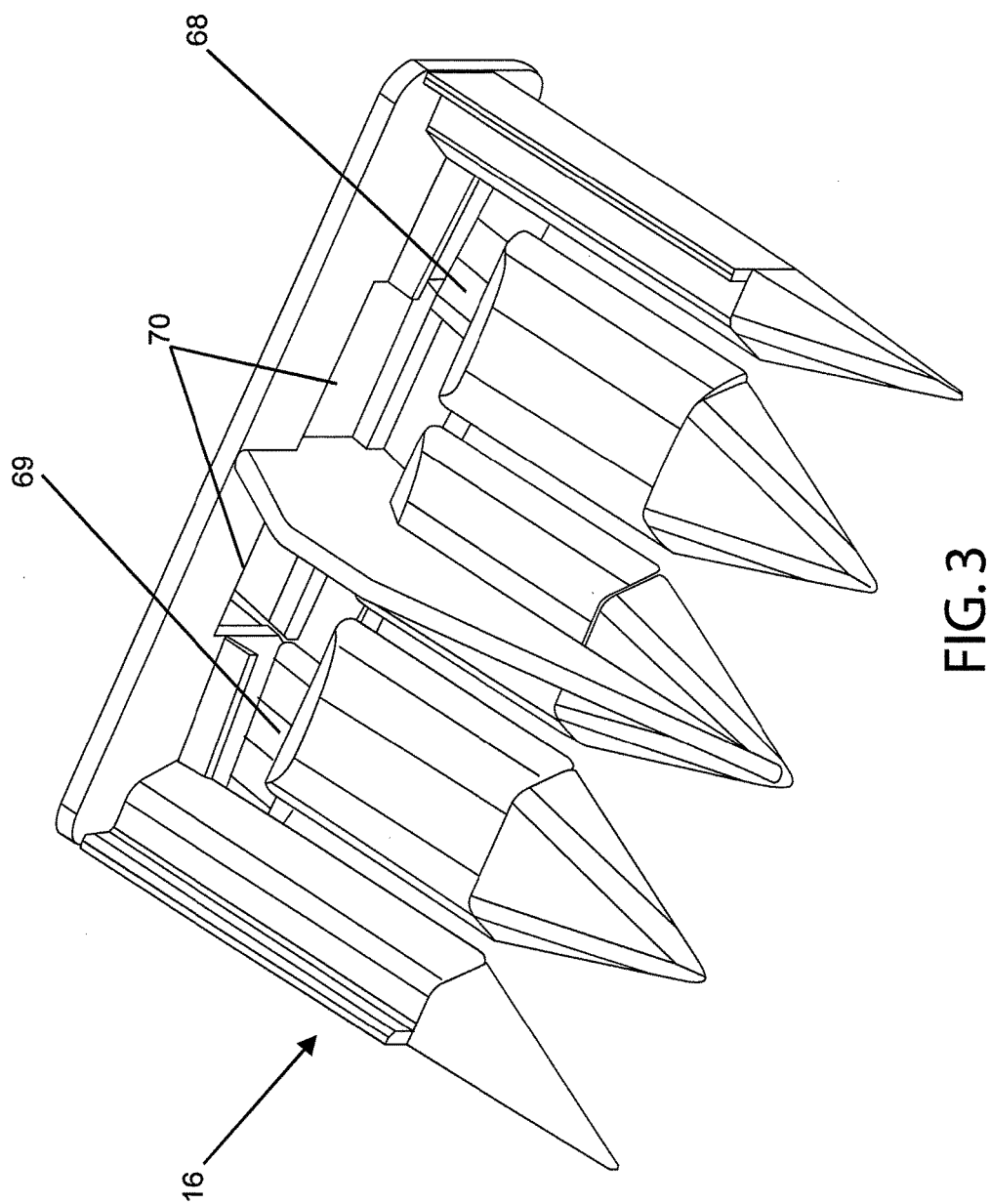
Figure 4:
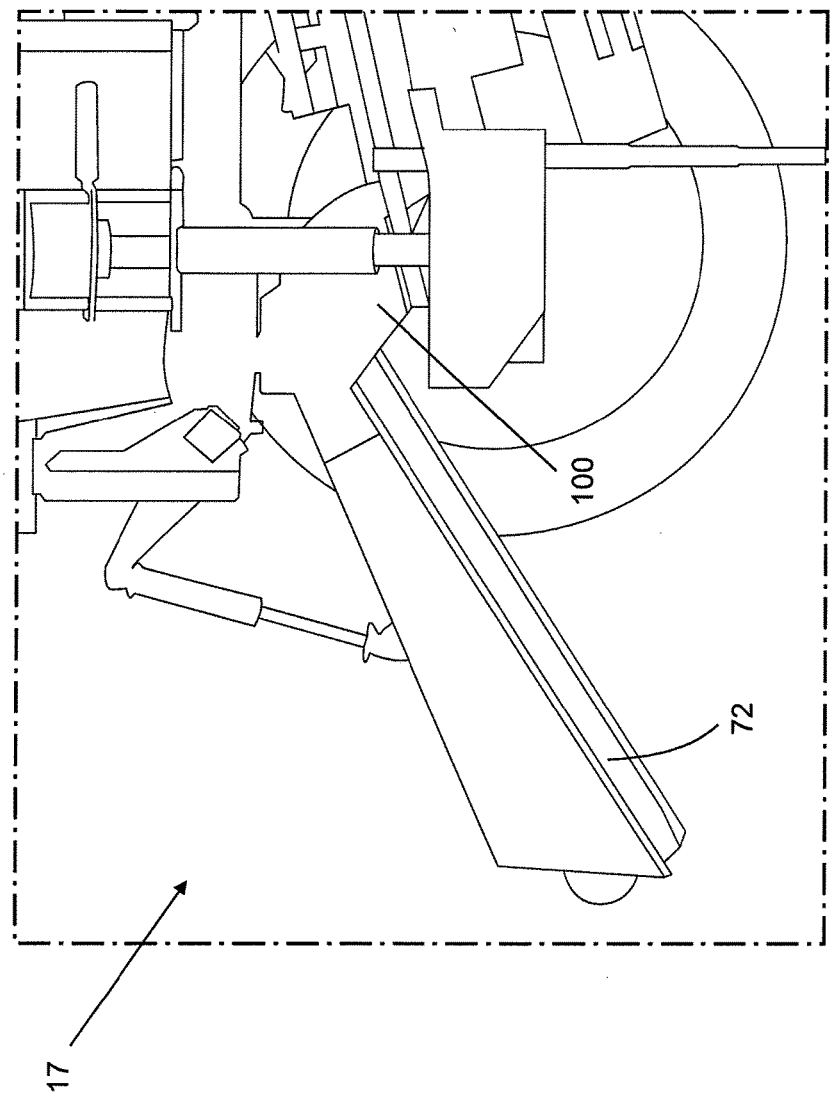
Figure 5:
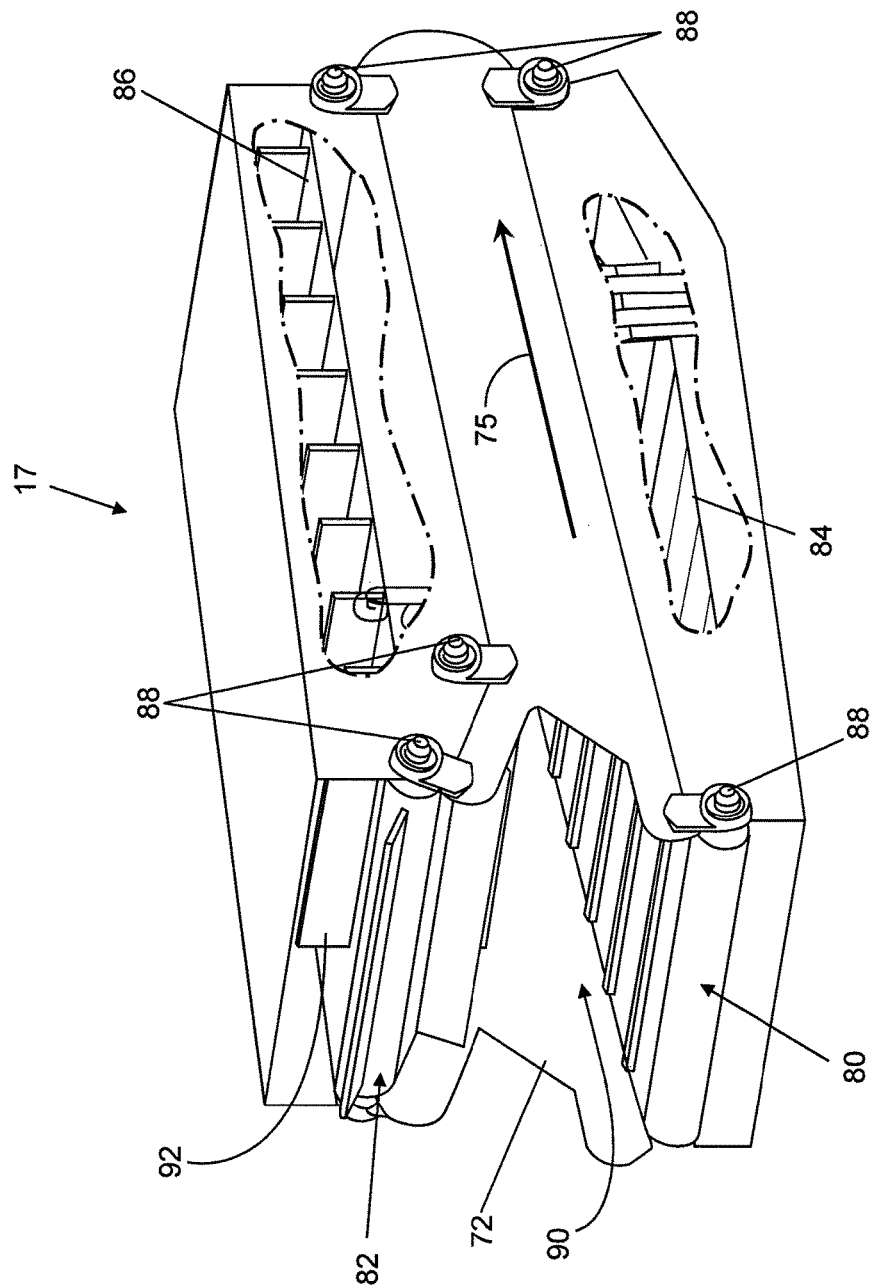
Figure 6:
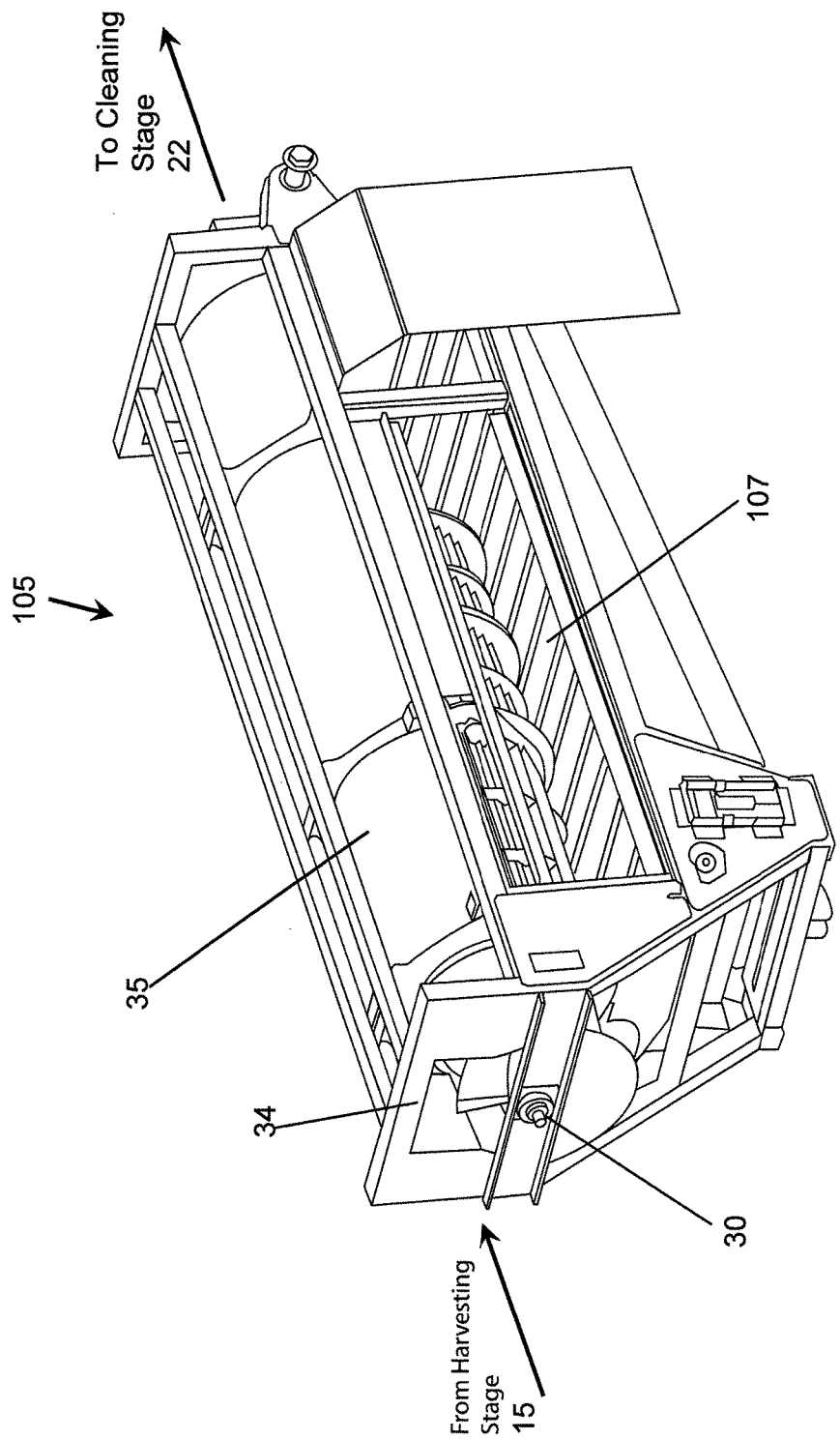
Figure 7:
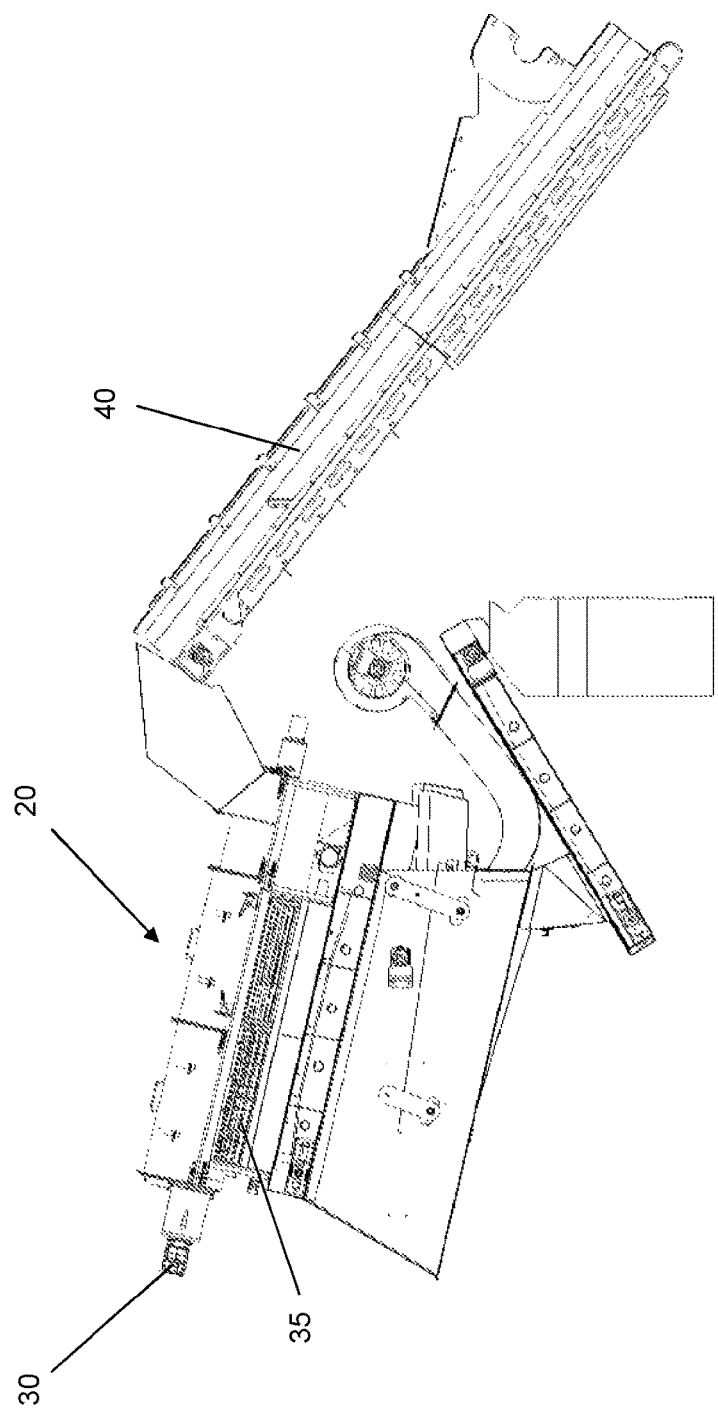
Figure 8:
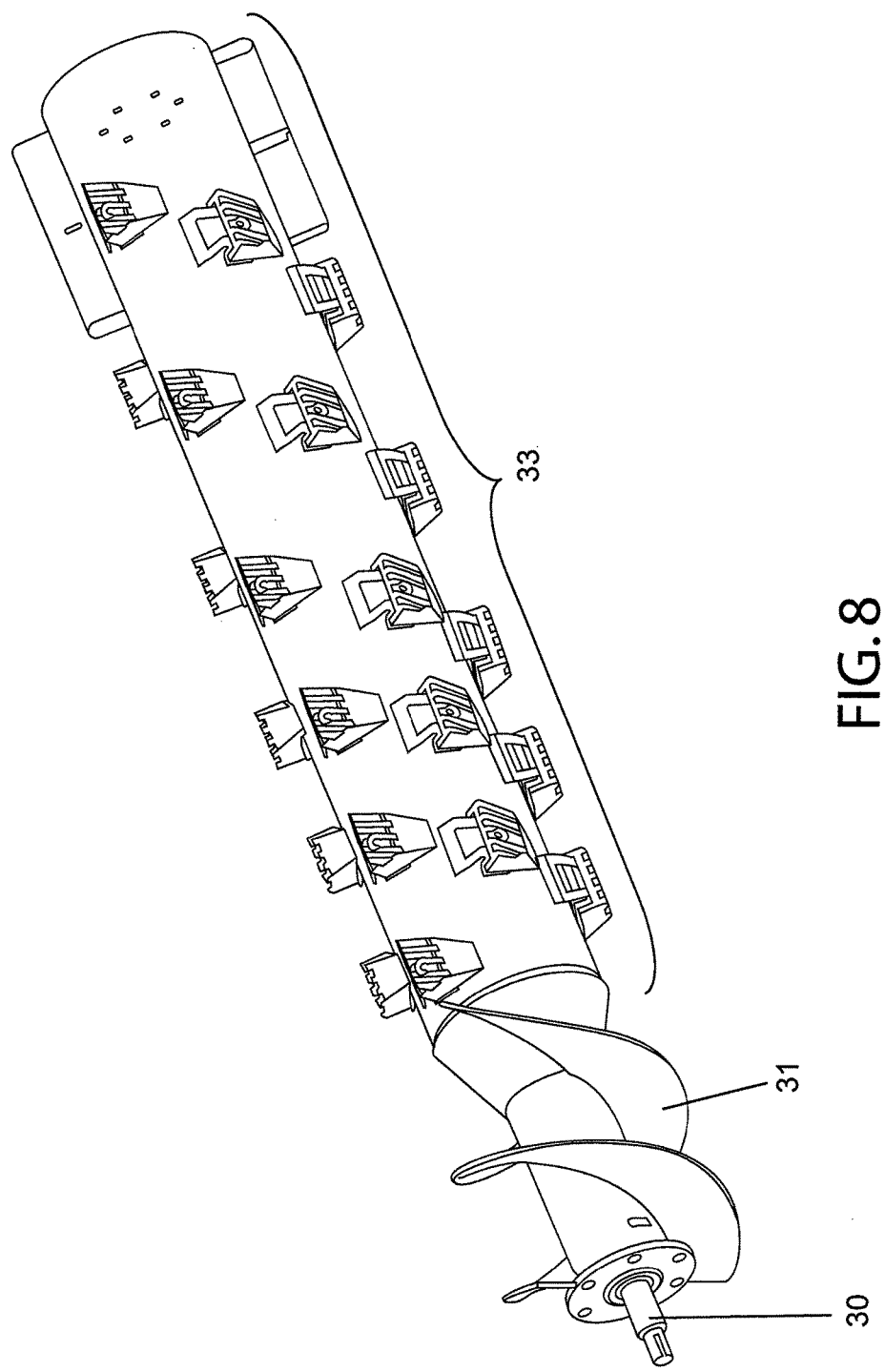
Figure 9:
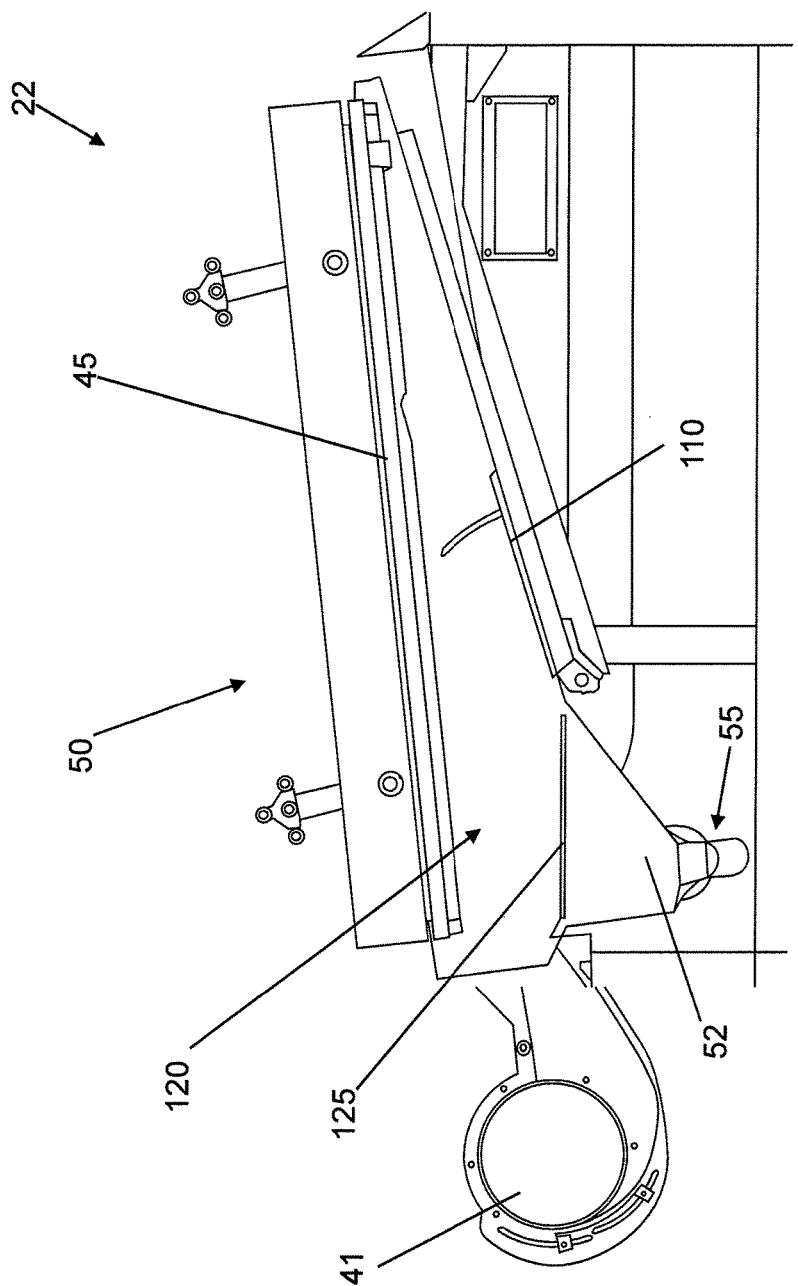
Figure 10:
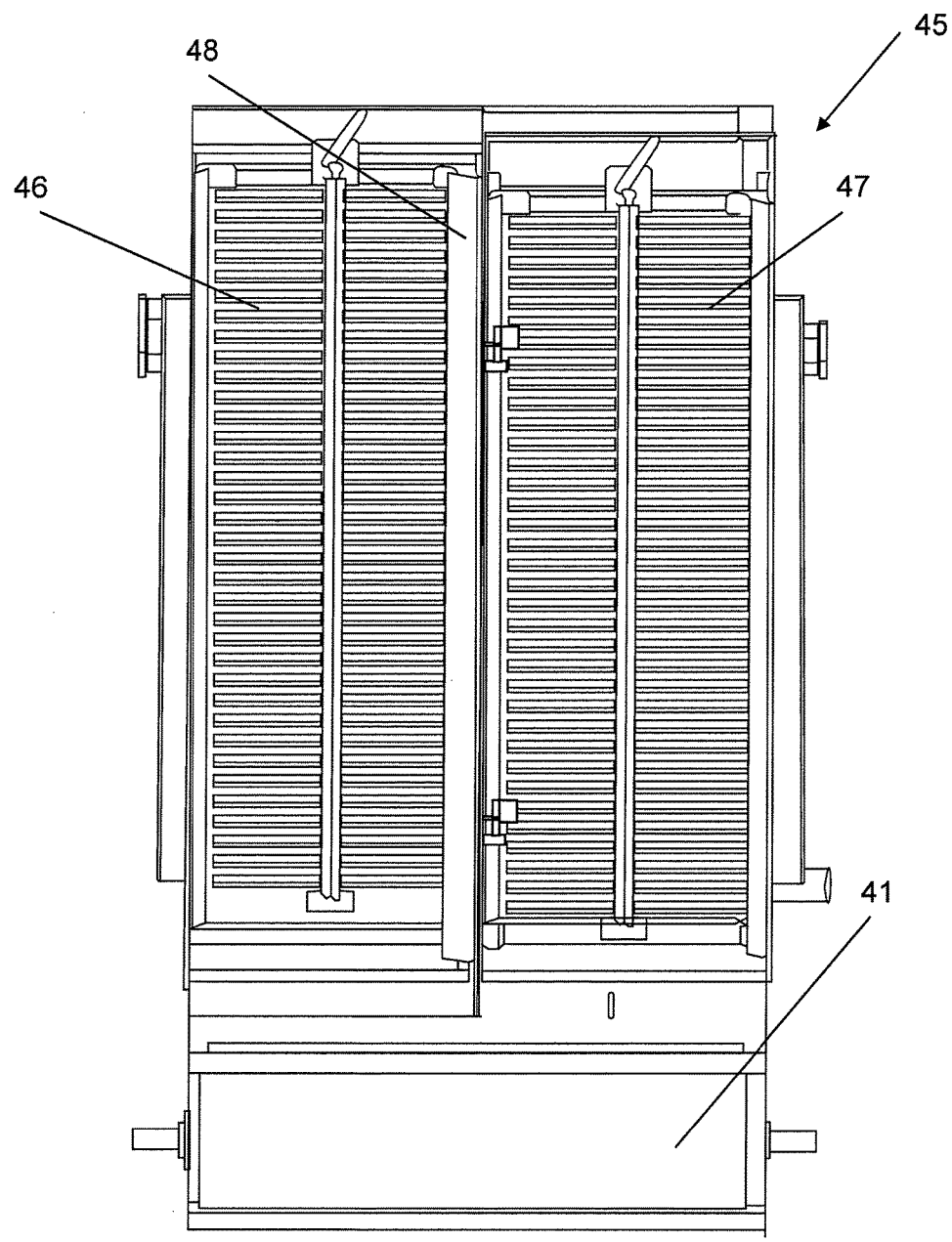
Figure 11:
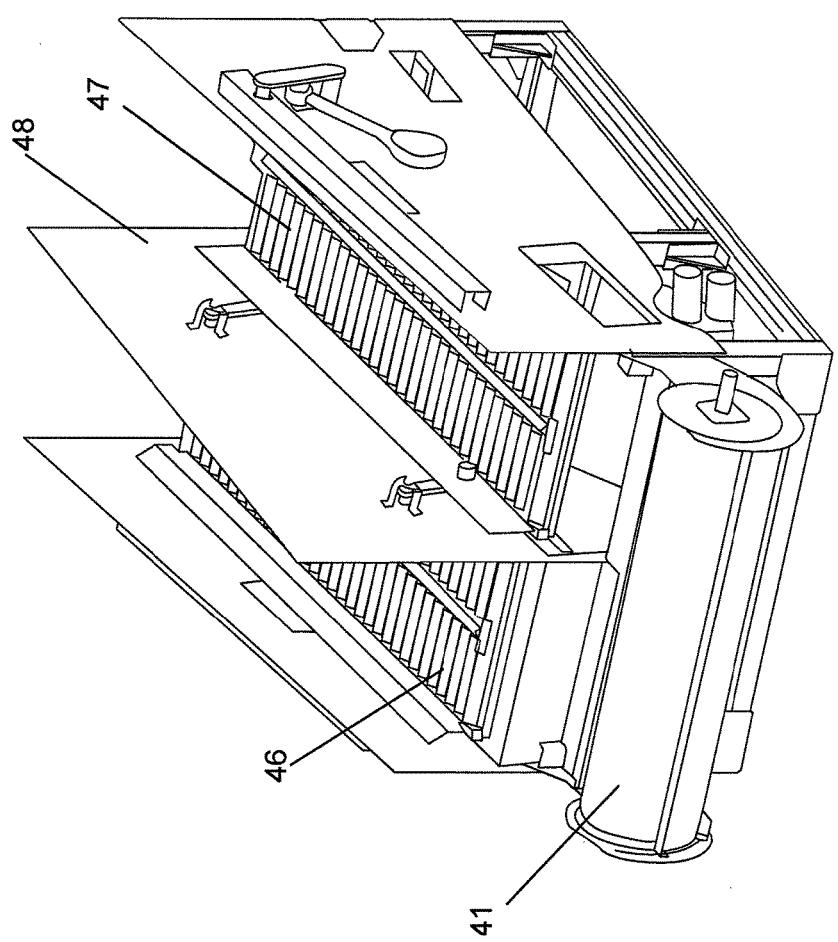

Having thus described the invention in general terms, reference will now be made to the accompanying drawings, which are not necessarily drawn to scale, and wherein:

FIG. 1 shows a perspective view of various portions of a combine harvester configured to execute a method of harvesting grain using a plurality of processing areas in accordance with an exemplary embodiment of the present invention;

FIG. 2 shows a side view of the portions of the combine harvester of FIG. 1 in accordance with an exemplary embodiment of the present invention;

FIG. 3 illustrates a header configured in accordance with an exemplary embodiment of the present invention;

FIG. 4 shows a side view of a feederhouse area in accordance with an exemplary embodiment of the present invention;

FIG. 5 shows a perspective view of the feederhouse area of FIG. 4;

FIG. 6 shows a perspective view of a combined feederhouse area and thresher area in accordance with an exemplary embodiment of the present invention;

FIG. 7 shows a side view of a thresher area and conveyor in accordance with an exemplary embodiment of the present invention;

FIG. 8 shows a perspective view of a rotor of the thresher area illustrated in FIG. 7 in accordance with an exemplary embodiment of the present invention;

FIG. 9 shows a side view of a cleaning area in accordance with an exemplary embodiment of the present invention;

FIG. 10 shows a top view of a sieve assembly of the cleaning area of FIG. 9 in accordance with an exemplary embodiment of the present invention; and FIG. 11 shows a perspective view of the sieve assembly of FIG. 10.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the combine harvester are not shown in one or more of the figures for clarity and to facilitate explanation of embodiments of the present invention.

As used herein, the terms "material," "crop," "plants," "crop material," and similar terms may be used interchangeably to refer generally to the plants being harvested and processed through the combine harvester, including grain and MOG. Thus, use of any such terms should not be taken to limit the spirit and scope of embodiments of the present invention. The crop material may include various types of grains such as, for example, corn, soybeans, canola, wheat, oat, rye, alfalfa, barley, rice, and sunflowers, among other crops, and/or the MOG associated therewith.

With reference to FIGS. 1 and 2, in general, a typical combine 10 includes a crop harvesting area 15, a feederhouse area 17, a threshing area 20, a cleaning area 22, and a grain delivery area 25. The crop harvesting area 15 may include a header 16 for gathering the grain from the planted crop. Although some headers 16 may be used for multiple different crops, a typical header is designed for use with a specific type of crop. As such, the header 16 may be removable from the combine so that other headers configured for use with other crops or crop row spacings may be attached in its place. In FIG. 1, for example, the depicted header 16 is configured for gathering corn.

Once the header 16 has gathered the grain at the harvesting area 15, the crop material may proceed to the feederhouse area 17, which may convey the crop material from the harvesting area 15 to the threshing area 20 via the conveyor 40. In other words, the crop material cut by the header 16 at the harvesting area 15 (which at this point includes both grain and MOG) may be fed rearwardly toward the threshing area 20 via the feederhouse area 17 and the conveyor 40, which may be a belt, auger, or other mechanism for moving material between locations.

Although the threshing area 20 may have different components and configurations, FIGS. 1 and 2 show two threshing rotors 30 that are mounted axially within the combine 10. The threshing rotors 30 may be substantially surrounded by rotor concaves 35 that have an arrangement of relatively small openings. Thus, as the crop material travels rearwardly through the threshing area 20, the threshing rotor threshes the crop material against the inside surface of the rotor concaves 35, separating the grain from the MOG.

The MOG typically continues to move through the rotor concaves 35 due to the rotation of the rotor 30 and is ultimately released out of the tail end of the rotor and is disposed onto the crop field, in some cases aided by a supplemental spreading device (not shown). The smaller crop material, composed substantially of grain, falls through the openings of the rotor concaves 35. The threshing area 20 leads to the cleaning area 22, where the grain is placed onto a series of sieves 45 that move back and forth. The sieves 45 may include an arrangement of smaller openings that further separate the heavier grain from any other non-grain crop material.

In some embodiments, a fan 41 may be included that is configured to blow air across the grain so as to separate lighter non-grain crop material from the grain before the grain is collected in an auger tube 53 or, in some embodiments, a grain pan 52. In some embodiments, the lighter non-grain material may be mixed with the larger non-grain crop material and may be disposed onto the crop field. Once the grain falls through the moving sieves 45, it reaches a grain handling system positioned below the moving sieves 45.

In a typical harvesting application, the combine is configured to send all of the harvested grain directly to a grain tank 60. In some instances, however, at least a portion of the harvested grain is tested and/or sampled for various characteristics at a testing area 50. The testing area may include one or more testing stations configured to gather grain test data. The testing area may include, for example, a moisture test station, a bulk density station, and a plot weight station.

Alternatively or additionally, after the grain has been cleaned, it is conveyed from the auger tube 53 to a grain tank 60 as part of the delivery area 25. Thus, in some embodiments, a clean grain auger 55 (shown in FIG. 9) may be disposed within the auger tube 53. The clean grain auger 55 may be configured to move the grain collected in the tube 53 transversely to one side of the combine 10, where it may travel to a grain tank 60 via a transport system 65, such as a clean grain elevator. In other embodiments, the transportation system 65 may be a conveyor, auger, or pneumatic transport system.

In conventional combines, various parts of the combine such as the moving sieves, the clean grain auger, and the grain transport system are mechanically actuated via a belt and pulley system, a hydraulic system, an electrical system, or other known means, driven by the combine engine so as to associate the speed of the sieves, auger, and grain elevator (for example) with the speed of the combine engine. In other words, in conventional systems, the ground speed of the combine may be adjusted to control the volume of material moving through the combine from the header 16 to the grain tank 60. A commercial combine is designed to be continuously operated in a fully loaded condition to optimize performance (e.g., material throughput, harvesting efficiency, and harvested grain quality).

As will be described below, the present invention is generally directed to a combine harvester 10 and method for gathering grain and processing grain in a staged manner. In general, the combine harvester 10 is moved through crop material comprising grain material and material other than grain ("MOG"). The grain material is separated from the MOG using multiple processing areas as the harvest material is transported through the combine harvester, including, for example, a harvesting area 15, a feederhouse area 17, a threshing area 20, a cleaning area 22, and a grain delivery area 25, depicted in FIG. 1 and generally described above. In a location at or prior to entering one of the processing areas, however, the material may be collected and held until a collection threshold is reached.

Once it is determined that the collection threshold is reached, the material (which now forms a first group of material) may be transported from the location to the processing area or a subsequent processing area. The first group of material is transported from the location to the processing area or the subsequent processing area substantially simultaneously and thus simulates the gathering of a large amount of crop material even when small plots are involved. In this way, the benefits of large-plot harvesting may be extended to small-plot applications, as described in greater detail below.

Staging at the Harvesting Area

Staging of the material may occur at various locations of the combine 10, such as at the harvesting area 15. Referring to FIG. 3, for example, the header 16 may be configured to include first and second transverse conveyors 68, 69. The first and second transverse conveyors 68, 69 may be configured to move harvest material from the sides of the header 16 toward one or more openings 70, through which the material may pass from the harvesting area 15 to the feederhouse area 17. By adjusting the speed of movement of the first and second transverse conveyors 68, 69, each conveyor may serve as a staging location for the harvest material. For example, the first and second transverse conveyors 68, 69 may be slowed down when the quantity of grain being harvested is relatively small until a collection threshold is reached. Once the threshold is reached, the speed of the first and second transverse conveyors 68, 69 may be increased to move the harvest material as a group to the openings 70 so that the material may be moved, as a batch, from the harvesting area to the feederhouse area 17. The first and second transverse conveyors 68, 69 may be a belt, as shown in FIG. 3, or an auger.

Staging at the Feederhouse Area

Staging of the material may additionally or alternatively occur at the feederhouse area 17. In this case, the material may be harvest material that is collected at the feederhouse area 17 and is transported, as the first group of material, from the feederhouse area 17 to the threshing area 20. With reference to FIGS. 4 and 5, the feederhouse area 17 may include a conveyance device 72. Collecting the harvest material at the feederhouse area 17 may thus comprise moving the harvest material away from the harvesting area 15 using the conveyance device 72. The speed of the combine harvester 10 through the plot may be greater than or equal to a speed at which the conveyance device 72 moves the harvest material away from the harvesting area 15 when collecting the harvest material. Thus, although the combine may be moving rapidly through a plot, the conveyance device 72 may be configured to move the harvest material from the harvesting area 15 to the threshing area 20 at a relatively slower rate. In addition, in order to effect the staging of the material, the conveyance device 72 may be configured to move the harvest material away from the harvesting area 15 (in the direction of the arrow 75 in FIG. 5) at a first speed, while the feederhouse area 17 is configured to transport the first group of harvest material to the threshing area 20 at a second speed, the first speed being less than the second speed.

With reference to FIG. 5, for example, the conveyance device 72 may comprise a lower member 80 and/or an upper member 82. One or both of the members 80, 82 may comprise a conveyor, which may include a continuous belt 84, 86 that is driven by one or more axles 88, such that the lower and upper members may cooperate to move harvest material in direction of the arrow 75, toward the threshing area 20. In some cases, both the lower and the upper members 80, 82 may be configured to contact the grain (e.g., within a chamber 90 of the conveyance device 72).

Thus, the first group of material may, upon entering the feederhouse area 17 from the harvesting area 15, be collected (e.g., between two or more extensions 92) until the collection threshold is reached. By decreasing the first speed at which the conveyance device 72 moves the harvest material away from the harvesting area 15, more harvest material may be received from the harvesting area and may be deposited to form the first group. Then, once the collection threshold is reached, the conveyance device 72 may be operated at a faster, second speed. Thus, the feederhouse area 17 may convey the collected first group of material to the threshing area 20 at the faster, second speed, thereby providing a relatively large slug of material to the threshing area 20 to promote processing efficiency at the threshing area 20.

Referring to FIG. 4, in other embodiments, a holding area 100 may be provided between the conveyance device 72 of the feederhouse area 17 and the conveyor 40. Thus, harvest material may be deposited by the conveyance device 72 into the holding area 100 to form the first group of material. The harvest material may remain stationary in the holding area 100 until the collection threshold is achieved, at which point the collected harvest material, which now constitutes the first group of material, is conveyed substantially simultaneously to the threshing area 20. The holding area 100 may be used to collect the crop material in lieu of or in addition to the feederhouse staging. In some embodiments, the conveyor 40 itself may serve as the holding area 100.

By staging the harvest material at or near the feederhouse area 17 as described above, additional harvest material may be removed from the plot using the header 16 at the harvesting area 15 and transported to the feederhouse area 17. The additional harvest material may be transported to the feederhouse area 17 after the first group of harvest material has been transported from the feederhouse area 17 to the threshing area 20. The additional harvest material may be collected at or near the feederhouse area 17 to form an additional group of harvest material (e.g., a second group of harvest material), which may be the same as or different from the first group of harvest material. For example, the first group may be harvest material collected from one plot, whereas the second group may be harvest material collected from a second, different plot. Thus, the speed of the conveyance device 72 may be continually adjusted, independently from the movement of the combine harvester 10 to allow for the collection of material at the first speed, and subsequent conveyance of the material to the threshing area 20 in one or more batches (e.g., via a first group of material, a second group of material, a third group of material, etc.).

Turning to FIG. 6, in some cases the feederhouse area 17 may be combined with or replaced by a threshing area 20, such that material discharged from the opening 70 of the header 16 at the harvesting area 15 enters directly into a feederhouse thresher 105 (e.g., via an inlet 34). The feederhouse thresher 105 may be an axial-flow threshing apparatus including a threshing rotor 30 that is substantially surrounded by rotor concaves 35, as described above. Once crop material has been threshed, it may be conveyed to the cleaning area 22 via a conveyor 107 disposed below the feederhouse thresher 105. Combining the feederhouse area with the threshing area may thus eliminate one step of the process and improve the overall efficiency of the combine harvester. Furthermore, as described above with respect to the feederhouse area 17, the conveyor 107 of the feederhouse thresher 105 may be configured to have adjustable speeds, similar to the conveyance device 72. In this way, the conveyor 107 may serve as a location for staging of the threshed material prior to conveyance to the cleaning area 22.

Staging at the Threshing Area

Referring to FIGS. 6, 7, and 8, staging may additionally or alternatively occur at or near the threshing area 20.

In some embodiments, the efficiency of the threshing area is further enhanced by positioning the inlet 34 of the threshing area 20 at an upper location with respect to the threshing rotor 30, as shown in FIG. 6. By positioning the inlet 34 at the upper location, the force of gravity may be used to facilitate the movement of the material from the inlet into the threshing area 20 (e.g., toward the auger 31). In addition, such positioning of the inlet 34 may in some cases avoid the backward movement of material (e.g., movement toward the harvesting area 15) that may result from the motion of the auger 31 at a lower location, as the auger rotates about the axis of the rotor 30.

Staging at the Cleaning Area

Referring now to FIGS. 9-11, staging may additionally or alternatively take place at or near the grain cleaning area 22. In particular, material that has been passed through the threshing area 20 may be conveyed to the cleaning area 22 or, in some embodiments, the conveyor 107 (shown in FIG. 6), where it may be passed through series of moving sieves 45 to separate the heavier grain from any other non-grain crop material, as described above.

As noted above, the sieve assembly 45 may be configured to move, e.g., from front to back, with respect to the movement of material through the combine. As a result of this movement, conventional sieve assemblies 45 may be unbalanced and may vibrate or shake within the combine.

Thus, in some embodiments, the sieve assembly 45 may be configured such that a first sieve 46 is provided on one side and a second sieve 47 is provided on the other side of the sieve assembly 45, as shown in FIGS. 10 and 11. The first and second sieves 46, 47 may be separated by a partition 48, and each sieve may be configured to move in a direction opposite that of the other sieve. For example, the first sieve 46 may be configured to move from front to back, whereas the second sieve 47 may be configured to move from back to front. By using an opposite pattern of movement, the net movement of the sieve assembly 45 may approach zero as the movement of the two sieves 46, 47 will balance each other, reducing the amount of vibration. In some cases, where the combine is used to harvest material from two plots, the first sieve 46 may be used for material from one plot, and the second sieve 47 may be used for material from another, different plot. In this way, material from each plot may be processed concurrently, but separately.

Once the grain has fallen through the sieve assembly 45, it may be moved via a conveyor 110 to a staging location 120 (shown in FIG. 9), where it is held until the collection threshold is reached. As noted above with respect to the conveyor 40, the conveyor 110 may be a belt, an auger, or any other mechanism for conveying material between two locations. Upon reaching the collection threshold (thereby forming the first group of material), in some embodiments a door 125 may be displaced to allow the collected first group of material to drop, as a batch, into a pan 52. In other embodiments, the collected first group of material may drop into the auger tube 53. From the pan 52 or auger tube 53, the first group of material may be moved by the clean grain auger 55 transversely to one side of the combine 10, where it may travel to the grain tank 60 via the transport system 65 as described above (shown in FIGS. 1 and 2). Because, in some embodiments, the grain is collected at the staging location 120 and is only passed to the clean grain auger 55 as a group via the movement of the door 125, the clean grain auger 55 may be more efficient in moving the grain, as a group, to the area of the combine 10 to be moved to subsequent processing areas, even when relatively small quantities of grain are being harvested by the combine 10. At the same time, once a first group of grain has been passed through the door 125 to the clean grain auger 55 and the door is returned to the collecting (e.g., closed) position, a subsequent batch of material (e.g., a second group) may be cleaned and collected at the staging location 120. In some embodiments, however, instead of a door 125, the grain may be collected directly onto a conveyor, which may move a first group of the grain to the next location only once the collection threshold is achieved. In still other embodiments, the grain may be placed into an airlock that is part of a pneumatic conveyance system. The pneumatic conveyance system may only be activated to move the grain to the next location once the collection threshold is reached.

Staging at Other Processing Areas

As noted above, staging may occur at one or more of a number of processing areas, such as the harvesting area, the feederhouse area, the threshing area, and the cleaning area. In addition, depending on the configuration of the combine harvester 10, additional processing areas may be provided. For example, the combine may include a grain conveying area, a grain material delivery area, and/or a grain testing area, as described above. The grain conveying area may include a conveyor that is configured to move grain from the threshing area 20 to the cleaning area 22. The grain material delivery area may follow the grain cleaning area 22 and, as noted above, may include an elevator, an air lock, or a similar method of moving the clean grain to a location on the combine harvester where the grain may be ground, tested, and/or held for removal from the combine and/or further processing. At the grain testing area, which may follow the grain material delivery area, the clean grain may be collected and analyzed to determine certain properties of the grain. For example, the moisture level, weight, oil content, protein content, starch content and/or the bulk density of the grain may be measured at the grain testing area. In some cases, the grain testing area may be directly below the cleaning area, in which case the grain would not need to be conveyed from the cleaning area to the grain testing area. Furthermore, the analysis of the grain may take place simultaneously with (e.g., as part of) the staging of the material at the testing area. In other words, the grain may be analyzed at the testing area while being held for a period of time to reach the collection threshold.

Thus, collection of the material in the location may include collecting grain material in a location at or prior to entering one or more of the grain conveying area, the grain material delivery area, and/or the grain testing area, in addition to or instead of at or prior to the harvesting area, the feederhouse area, the threshing area, and the cleaning area described above.

For example, collecting material in the location may comprise collecting grain material prior to entering the grain conveying area, and transporting the first group of material from the location to the processing area or a subsequent processing area after the collection threshold is reached may comprise transporting a first group of grain material from the grain conveying area to the cleaning area after the collection threshold is reached. For example, the conveyor 40 may be configured to slow down or stop to allow staging to occur before delivering the grain to the threshing area. Similarly, grain material may be collected at the cleaning area and a first group of grain material may be transported from the cleaning area to the grain material delivery area after the collection threshold is reached.

As another example, grain material may be collected prior to entering the grain material delivery area, and a first group of grain material may be transported from the location to the grain material delivery area after the collection threshold is reached. As yet another example, grain material may be collected at the grain material delivery area, and a first group of grain material may be transported from the grain material delivery area to the grain testing area after the collection threshold is reached. In other cases, grain material may be collected prior to entering the grain testing area, and a first group of grain material may be transported from the location to the grain testing area after the collection threshold is reached. Furthermore, one or more of the processing areas may be controlled independently of the other processing areas, such that a given group of material may be processed in an efficient manner with respect to the particular processing area.

Regardless of where the staging occurs or in how many locations, staging in this manner may facilitate the processing of multiple research plots through the combine harvester more efficiently without increasing the risk of cross-contamination between grain from different plots, as the staging is intended to keep grain harvested from a particular plot together and separated from grain harvested from other plots. For example, staging prior to the grain testing area may allow testing of grain from a particular plot, only, minimizing the risk that grain from other plots may inadvertently be analyzed and cause inaccuracies in the test results.

In addition, as a result of staging, the combine harvester may be able to move between different plots with minimal wait times. For example, although a conventional research combine harvester may need to wait anywhere from 12 seconds to 24 seconds prior to moving from one plot of grain to the next, a combine harvester configured in accordance with embodiments of the present invention may be able to move between plots with only approximately 6-8 seconds or less of wait time required.

Determining the Collection Threshold

Regardless of where the staging occurs, in a location at or prior to entering one of the processing areas a determination is made regarding whether the collection threshold has been reached. In some cases, the collection threshold is determined by determining whether the combine has reached an end of a plot. For example, when the end of a plot has been reached (e.g., when an entire row of plants in the plot or all of the plants in the plot have been cut), the collected group of material may be moved to a subsequent processing area as no additional material would be expected to be introduced to the group.

In other embodiments, the collection threshold may be determined temporally. For example, determining whether a collection threshold is reached may include determining whether a time period beginning at the start of collecting the harvest material is greater than or equal to a threshold time period. In some cases, the collection threshold may be determined based on the mass or volume of the group of material collected. For example, the determination may be based on whether a mass of the first group of material is greater than or equal to a threshold mass. Similarly, the determination may be based on whether a volume of the first group of material is greater than or equal to a threshold volume. In other cases, the operator of the combine may determine that the collection threshold has been reached (such as through a visual inspection). In other cases, the determination may be made using a location-based trigger. For example, the location-based trigger may comprise determining whether a predetermined distance has been travelled by the combine or whether a predetermined time has elapsed. Alternatively, the location-based trigger may be based on a position of the combine in an area to be harvested, e.g., via a global positioning system (GPS) location or sensor input, such as a vision sensor. Any combination of methods may be used to determine whether a collection threshold is reached.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for harvesting grain plots using a combine harvester, the method comprising: moving the combine harvester through harvest material, wherein the harvest material is located in a field with multiple research plots, and wherein each research plot defines at least one batch of harvest material, wherein the harvest material comprises grain material and material other than grain; transporting a first batch of harvest material into a threshing area, wherein the conveyance device into the threshing area deposits the first batch of threshing material above the threshing area, separating the grain material from the material other than grain to obtain clean grain, collecting a first batch of clean grain at a clean grain staging location until a collection threshold is reached, and once the collection threshold is reached, transporting at least a portion of the first batch of clean grain to a testing area to obtain grain test data, and repeating the transporting, threshing and testing steps for successive batches of harvest material, so that each batch of harvest material remains separate from the preceding batch of harvest material, and grain test data is obtained for each batch of clean grain.

2. The method of claim 1, wherein the clean grain staging location comprises placing the grain in an airlock.

3. The method of claim 2, wherein the airlock is part of a pneumatic conveyance system.

4. The method of claim 1, wherein the clean grain staging location is activated by a door.

5. The method of claim 4, wherein the grain is passed to a clean grain auger as a group via movement of the door.

6. The method of claim 1, wherein the clean grain is placed on a conveyor that moves the clean grain when the collection threshold is reached.

7. The method of claim 1, wherein the clean grain is transported to a subsequent location by a clean grain auger disposed within an auger tube.

8. The method of claim 1, wherein the collection threshold is equal to the clean grain from a research plot.

9. The method of claim 8, wherein the research plot is a small-area research plot.

10. The method of claim 8, wherein the collection threshold is determined by at least one of:
determining whether the combine harvester has reached an end of a plot,
determining whether a predetermined distance has been traveled by the combine harvester,
determining a position of the combine harvester,
determining whether a time period beginning at a start of collecting the harvest material is greater than or equal to a threshold time period,
determining whether a mass of a first group of material is greater than or equal to a threshold mass, or
determining whether a volume of the first group of material is greater than or equal to a threshold volume.

11. The method of claim 8, wherein the clean grain staging location comprises placing the grain in an airlock.

12. The method of claim 11, wherein the airlock is part of a pneumatic conveyance system.

13. The method of claim 8, wherein the clean grain staging location is activated by a door.

14. The method of claim 13, wherein the grain from the research plot is passed to a clean grain auger as a group via movement of the door.

15. The method of claim 8, wherein the clean grain is placed on a conveyor that moves the clean grain when the collection threshold is reached.

16. The method of claim 8, wherein the clean grain is transported to a subsequent location by a clean grain auger disposed within an auger tube.

17. A harvester for harvesting separate batches of harvest material, wherein the harvest material is obtained from a research plot located in a field comprising multiple research plots, and wherein each research plot defines at least one batch of harvest material, said combine harvester comprising a threshing area and a conveyor that deposits the batch of harvest material above the threshing area, wherein successive batches of harvest material are fed into the threshing area so that the grain from each batch of harvested material is not comingled with grain from the other batches of harvest material, and wherein a pneumatic conveyance system is used to transfer the threshed grain to a testing area, so that the grain from each batch of harvested material is not commingled with grain from the other batches of harvested material.

18. The harvester of claim 17, wherein an airlock is part of the pneumatic conveyance system, and at least a portion of the grain is collected at the airlock until a collection threshold is reached.

19. A harvester for harvesting separate batches of harvest material, wherein the harvest material is obtained from a research plot located in a field comprising multiple research plots, and wherein each research plot defines at least one batch of harvest material, said combine harvester comprising a threshing area and a conveyor that deposits the batch of harvest material above the threshing area, wherein successive batches of harvest material are fed into the threshing area so that the grain from each batch of harvested material is not comingled with grain from the other batches of harvest material, and wherein a grain auger conveyor disposed within an auger tube is used to transport the threshed grain from the threshing area to a testing area, and the threshed grain is collected at the grain auger conveyor so that the threshed grain from each batch of harvested material is not comingled with the threshed grain from the other batches of harvest material.

* * * * *